United States Patent [19]
Dale et al.

[11] 3,711,821
[45] Jan. 16, 1973

[54] SONOBUOY SUSPENSION SYSTEM

[75] Inventors: John R. Dale, Willow Grove, Pa.; Roger A. Holler, Easton, Pa.; Garnet Goss, Haverford, Pa.

[73] Assignee: The United States of America as represented by the Secretary of the Navy

[22] Filed: Nov. 23, 1970

[21] Appl. No.: 92,057

[52] U.S. Cl. ............................ 340/2, 9/8 R, 340/8 S
[51] Int. Cl. ........................................... B63b 21/52
[58] Field of Search ............ 340/2, 3 T, 4 R, 5 R, 8 S, 340/8 R; 114/209, 235 B; 9/8 R

[56] References Cited

UNITED STATES PATENTS

| 3,191,202 | 6/1965 | Handler | 9/8 |
| 3,024,440 | 3/1962 | Pence | 340/4 R |
| 3,543,228 | 11/1970 | Farmer et al. | 340/2 |
| 728,330 | 5/1903 | Temperley et al. | 114/209 |
| 2,449,085 | 9/1948 | Peterson | 340/2 X |
| 3,329,015 | 7/1967 | Bakke et al. | 340/2 UX |

Primary Examiner—Richard A. Farley
Attorney—R. S. Sciascia and Henry Hansen

[57] ABSTRACT

A sonobuoy having a hydrophone deployable in water at a predetermined depth below a drifting surface float by a suspension system which includes a pair of compliant cables connected by a subsurface assembly and terminates near the hydrophone with a drogue unit. The subsurface assembly is slightly negative in buoyancy and includes a disc whose planar surfaces are approximately horizontally aligned in the water. The drogue unit includes a perforated flexible sleeve open at both ends and a perforated disc intermediate the ends whose planar surfaces are approximately horizontally aligned.

17 Claims, 7 Drawing Figures

PATENTED JAN 16 1973 3,711,821

INVENTOR.
JOHN R. DALE
ROGER A. HOLLER
GARNET GOSS
BY Henry Hansen
ATTORNEY

SONOBUOY SUSPENSION SYSTEM

BACKGROUND OF THE INVENTION

The present invention relates generally to sonobuoys; and, more particularly, to a sonobuoy suspension system for attenuating motion of cable-suspended acoustic detectors or hydrophones.

Underwater detectors or hydrophones presently in use are often of a type sensitive to both acoustic signals and acceleration of the hydrophone. Typically the sensitivity of a hydrophone to accelerations increases with the acoustic sensitivity. These accelerations of the hydrophone are primarily caused by vertical motion of the surface float on waves which is induced through the suspension cables and by horizontal motion of the hydrophone in an unsteady flow field. The vertical motion generally produced by the waves on the surface float is typically reduced in prior art systems with an actual mass depending from a compliant cable where increasing the actual mass or the cable compliance provides increased attenuation. The horizontal motions or accelerations primarily due to the subsurface flow field is generally reduced by simply increasing the lateral drag area at the hydrophone. These techniques, when used separately or in combination, severely limit the amount of attenuation and ranges of operating depths available from a compliant cable-mass combination due to unavailability of cables with appropriate combinations of ultimate strength and elastic coefficient to support the mass required and to produce an acceptable attenuation system for the dominant frequencies of wave motion.

SUMMARY OF THE INVENTION

Accordingly, it is the general purpose and object of the present invention to provide an improved sonobuoy suspension system in which a hydrophone depending from a surface float will effectively attenuate the dominant wave motion frequencies of the float.

Another object of the invention is to provide a sonobuoy suspension system which will relieve the load carried by the cable in a sonobuoy suspension system thereby allowing for high compliance coefficients in the cable independent of its length.

Another object of the invention is to utilize the hydrodynamic properties of the sea in order to damp and to lower the attenuation characteristics of a sonobuoy suspension system.

Yet another object of the invention is to provide a sonobuoy suspension system which will minimize the velocity of the flow field relative the hydrophone thereby reducing its horizontal acceleration.

These and other objects are accomplished in a sonobuoy according to the invention by suspending a hydrophone from a surface float wherein the suspension system is characterized as a series of mechanical filters. Each filter includes a compliant cable supporting a mass in combination with thin discs or surfaces disposed to provide damping and mass augmentation by accelerating hydrodynamic volume. The surfaces proximate the hydrophone are formed to provide a large lateral drag area thus limiting flow field differential relative the hydrophone. To attenuate low frequency surface motion, large masses in combination with high compliance cables are necessary. Accordingly the invention provides subsurface floats attached to the masses thus relieving the combined weight of the masses allowing for short, high compliance cables of small cross section.

DESCRIPTION OF THE PREFERRED EMBODIMENTS

Figure 1:
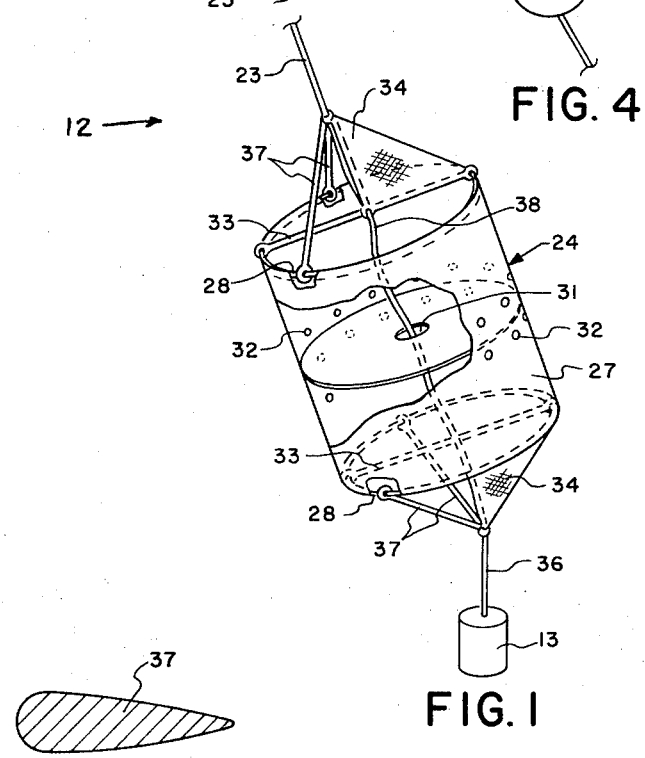
FIG. 1 shows a view in elevation of one embodiment of a sonobuoy according to the invention deployed in the sea.
Figure 7:
FIG. 7 represents an enlarged cross-sectional view of a drogue strap as applied to the sonobuoy of FIG. 1.

Referring now to FIG. 1 a sonobuoy constructed according to the invention is illustrated deployed in the sea and having a drifting surface float 10 housing a conventional sonobuoy radio transmitter (not shown), an antenna 11, a suspension system indicated generally by the numeral 12, and a hydroplane 13 for detecting acoustic signals in the sea and transmitting them to a remote receiving station. The suspension system includes an upper elastic conductive cable 14 attached at the upper end to the submerged end of the float 10 and, at the lower end to two flexible bridle straps 16, either of which is conductive, which, in turn, are connected at diametrically opposite points on the circumference of a thin planar disc 17 of a subsurface assembly 18. The assembly 18 also includes a spherical mass 19, fixed with its center coinciding with the center of disc 17, and a spherical float 21 connected to mass 19 by a rod 22 coextensive with the disc axis. The weights and displacements of mass 19 and float 21, and the elasticity of cable 14 is determined in a manner described hereinbelow to maintain disc 17 substantially horizontal and the net buoyancy at assembly 18 slightly negative. A lower elastic conductive cable 23 is attached between the mass 19 opposite from rod 22 and a drogue 24. A conductor 26 connected between cable 23 and a conductive strap 16 is provided to maintain continuity of signal across subsurface assembly 16. Drogue 24 comprises a hollow fabric sleeve 27 urged open at either end by respective spring hoops 28. Intermediate the ends of sleeve 27 a circular rigid partition 29 is disposed in a plane normal to the length thereof. Partition 29 includes an opening 31 and sleeve 27 includes holes 32 on either side and adjacent to partition 29 to permit entrapped air to escape. A pair of flexible parallel members 33 are respectively connected at opposite sides of hoops 28 and are taut when the ends of sleeve 27 are fully open. One side of each of a lower and upper opposed right triangular alignment fins 34 is contiguously attached along the length of respective members 33 between the center and one side of each hoop 28. The other side of upper fin 34, when taut, extends outward along the sleeve and terminates at lower cable 23. The other side of lower fin 34, when taut, extends outward along the sleeve length and terminates at a hydrophone cable 36 which is electrically connected to hydrophone 13. Two pairs of paired straps 37 are attached to respective hoops 28 on either side of member 33 distal from fins 34 and terminate respectively at the lower cable 23 and hydrophone cable 36. To provide signal continuity across drogue 24 a conductor 38 is connected between cable 23 and cable 36 along fins 34 and through opening 31.

In operation cable 14 together with mass 19 and disc 17 combine to form a highly damped quadratic filter. Cable 23 in combination with the mass of hydrophone 13 and drogue 24 forms a second quadratic filter, also highly damped, where this filter attenuates the frequencies passed by the fins. The respective cut off frequencies defined by the two filters are determined by the combination of the over-all compliance or elastic constants of cables 14 and 23, respectively, and the effective mass suspended from each. In order that a sufficiently low frequency cut off be achieved low elastic coefficient of cables 14 and 23 and large effective masses are contemplated. Since typically a low elastic coefficient per unit length is achieved only at the expanse of the ultimate strength or cross section area of the cable a subsurface float 21 provides relief of the combined weight of mass 19 and the hydrophone 13 mass on cable 14. Thus, by combining the surface float 21 it is contemplated that cable 14 can be relatively short. Cable 23, therefore, can assume the maximum length allowable within the desired depth.

For example in an ocean environment the motion of the surface float 10 can be characterized in terms of its frequency content generally having a low frequency dominant component which produces the largest motions of the hydrophone 13. For illustration purposes the dominant frequency component is assumed to occur at .5 Hz. accordingly the cut-off frequency of the suspension system 12 must be sufficiently below 0.5 Hz. to result in adequate attenuation at the dominant frequency. For a suspension system 12 comprised of two serial spring-mass combinations, as, for example, illustrated in FIG. 1 a cut-off frequency of .25 Hz. of each of the spring-mass combinations will result in approximately 24 decibel attenuation of a .5 Hz. dominant frequency component. A cut-off frequency of each cable-mass combination is determined according to the relationship of $\omega = \sqrt{k/m}$ where $\omega$ is a cut-off frequency in radians per second; $k$ is the elastic constant of the respective cable; and $m$ is the effective mass respectively depending from each cable. Thus, by providing a $k$ of 2.45 pound per foot and the mass of 1 slug a cut-off frequency of .25 Hz. approximately will be achieved out of the cable mass combination. What is thus provided is a series of two quadratic filters with resonances at approximately .25 Hz. where the resonances are damped by hydrodynamic drag of a flat disc attached to the mass. The attenuation of the overall suspension system 12 comprised of a dual spring mass combination results in an 80 decibel per decade roll off beyond the respective cut-off frequencies of the individual spring mass combinations thus frequencies higher than the dominant frequency are attenuated to a greater extent.

The disposition of the float 21 is such that disc 17 is nominally oriented horizontally thereby exposing a minimal frontal area to lateral flow fields. The disposition of the drogue 24 is, on the other hand, such that a large drag area is exposed to lateral flow. Accordingly, the subsurface assembly 18 acts to attenuate vertical motion of float 10 and drogue 24 in combination with the mass of the hydrophone 13 acts to attenuate both the lateral and vertical motion of the subsurface assembly 18. The selection of the subsurface float 21 displacement volume is governed by cable 14 elastic limit such that in combination with mass unit 19 and the mass of hydrophone 13 a marginally negative buoyancy is achieved. While this embodiment is described with reference to one subsurface assembly 18, it is contemplated that for greater attenuation a plurality of subsurface assemblies 18 serially depending from cables 14 is within the scope of this invention.

Figure 5:
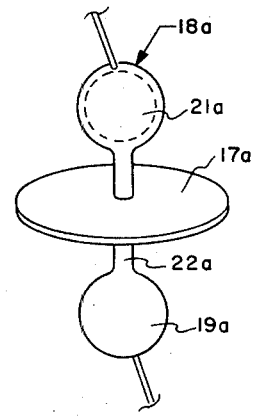
Figure 6:
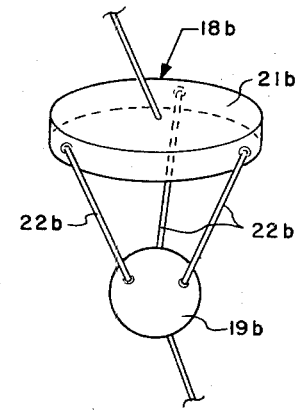

Alternate embodiments of subsurface assembly 18 disposing a float and a disc relative to a mass are shown in FIGS. 5 and 6. Subsurface assembly 18a (FIG. 5) includes a spherical mass 19a and spherical float 21a connected by a concentric rigid rod 22a with a planar disc 17a intermediate the ends and normal to the length thereof. Subsurface assembly 18b (FIG. 6) includes a spherical mass 19b depending from a cylindrical float 21b by flexible shroud 22b.

Figure 2:
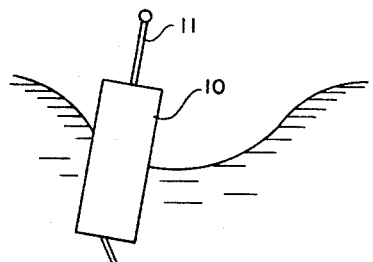
FIGS. 2, 3, 4, 5 and 6 show alternate embodiments of a subsurface assembly as applied in the sonobuoy of FIG. 1.
Figure 2:
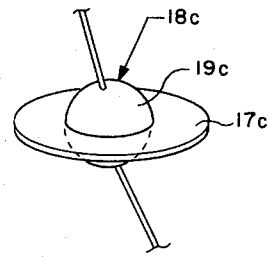
Figure 3:
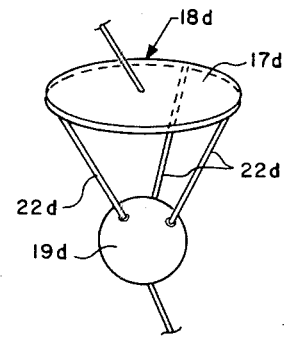
Figure 4:
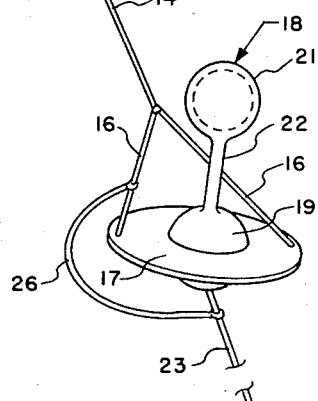
Figure 4:
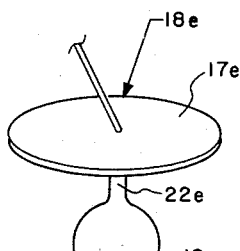

For the applications where the deployed depth of the hydrophone 13 allows for sufficient compliance in the cables without limiting their ultimate strength alternate subsurface assembly 18 embodiments shown in FIGS. 2, 3 and 4 are contemplated. These embodiments require less or no float relief accordingly any weight relief required is obtained by selecting the buoyancy of the mass. Specifically subsurface assembly 18c (FIG. 2) includes a spherical mass 19c with a planar disc 17c attached to the mass 19c and concentric therewith. Subsurface assembly 18d (FIG. 3) includes a spherical mass 19d depending from a planar disc 17d by flexible shrouds 22d. Subsurface assembly 18e (FIG. 4) includes a spherical mass 19e, a planar disc 17e and a rod 22e connecting the disc 17e and the mass 19e, concentric therewith and normal with its length with the plane of disc 17e.

Some of the many advantages and improvements over the prior art should now be readily apparent. The above-described invention provides significant improvements over prior art attempts to attenuate the motion of a hydrophone in a sonobuoy system by allowing for cut-off frequencies sufficiently low to filter the major components of sea motion within all deployment depths of of the hydrophone.

Obviously many modifications and variations of the present invention are possible in the light of the above teachings. It is therefore to be understood that within the scope of the appended claims the invention may be practiced otherwise than as specifically described.

What is claimed is:

1. A sonobuoy comprising, in combination:
   a surface float adapted to transmit or receive radio signals;
   a non-buoyant electroacoustic transducer;
   a non-buoyant subsurface assembly including a planar disc, a non-buoyant mass operatively connected to said disc with the centers of said mass and disc being on an axis normal to said disc;
   an upper compliant cable connected between said float and the upper extremity of said assembly at said axis; and
   a lower compliant cable connected between the lower extremity of said assembly at said axis and said transducer.

2. A sonobuoy according to claim 1, further comprising:

said mass including a sphere and a rod extending therefrom along said axis and attached at the end to one side of said disc.

3. A sonobuoy according to claim 1, further comprising:

said mass including a sphere; and said disc being concentrically attached to said sphere.

4. A sonobuoy according to claim 1, further comprising:

said mass including a sphere and a plurality of shrouds connected between the circumference of said disc and said sphere.

5. A sonobuoy according to claim 4, further comprising:

said disc including a buoyant material.

6. A sonobuoy according to claim 1, further comprising:

said mass including a non-buoyant sphere, a buoyant sphere, and a rod connected therebetween, the central axis of said rod intersecting the centers of said spheres; and said disc being attached to said rod intermediate its ends and concentric therewith.

7. A sonobuoy according to claim 1, further comprising:

said mass including a non-buoyant sphere and adapted to be connected to a lower cable;

said disc being concentrically attached to said non-buoyant sphere; and said orientation means including a buoyant sphere, a rod extending therefrom attached at the end to said non-buoyant sphere, the central axis of said rod intersecting the centers of said spheres, and a flexible bridle connected to the circumference of said disc and adapted to be connected to an upper cable.

8. A sonobuoy according to claim 1, further comprising: drogue means connected intermediate the ends of the upper cable for providing hydrodynamic drag.

9. A sonobuoy according to claim 8, further comprising:

said drogue means including a fabric sleeve urged open at either end by spring hoops;

a partition connected across said sleeve intermediate the ends thereof; and harness means extending from either end of said sleeve comprising three or more equal length straps connected in common at respective one ends and at the other ends to the circumference of the sleeve at equally spaced points the common connections of the respective harnesses adapted to be connected to flexible cables.

10. A sonobuoy according to claim 9, further comprising:

said sleeve and partition including perforation holes releasing entrapped air; and fins extending vertically from each end coplanar and contiguous with respective ones of said harness straps.

11. Apparatus for attenuating the vertical motion of a non-buoyant element suspended from a surface float, comprising:

a non-buoyant subsurface assembly including a planar disc, a non-buoyant mass operatively connected to said disc with the centers of said mass and disc being on an axis normal to said disc; and upper and lower elastic cables each having one end attached to respective opposite extremities of said assembly at said axis, and each having the other end formed to be operatively connected to the surface float and element, respectively.

12. Apparatus according to claim 22, further comprising:

said mass including a sphere, and a rod extending therefrom along said axis and attached at the end to one side of said disc;

said one end of said upper cable attached to the other side of said disc; and said one end of said lower cable attached to said sphere.

13. Apparatus according to claim 11, further comprising:

said mass including a sphere concentrically attached to said disc, the hemispherical circle of said sphere being coplanar with said disc; and said one ends of said upper and lower cables attached to the opposite sides of said sphere.

14. Apparatus according to claim 11, further comprising:

said mass including a sphere and a plurality of shrouds connected between the circumference of said disc and said sphere;

said one end of said upper cable attached to the side of said disc; and said one end of said lower cable attached to said sphere.

5. Apparatus according to claim 14, further comprising:

said disc including a buoyant material.

16. Apparatus according to claim 11, further comprising:

said mass including a non-buoyant sphere, a buoyant sphere, and a rod connecting therebetween along said axis;

said disc attached to said rod intermediate its ends and concentric therewith;

said one end of said upper cable attached to said buoyant sphere; and said one end of said lower cable attached to said non-buoyant sphere.

17. Apparatus according to claim 11, further comprising:

said mass including a non-buoyant sphere, a buoyant sphere, and a rod connected therebetween along the axis, said buoyant sphere concentrically attached to said disc with its hemispherical circle coplanar with said disc;

said disc including a bridle connected to the circumference thereof and to said one end of said upper cable; and said one end of said lower cable attached to said non-buoyant sphere.

* * * * *